CIRCUIT ARRANGEMENT FOR OPERATING A PERIODICALLY ACTIVATABLE SWITCHING TRANSISTOR
Filed March 21, 1963

Jnventor:
Hans Dieter Schneider

United States Patent Office 3,204,145

Patented Aug. 31, 1965

3,204,145

CIRCUIT ARRANGEMENT FOR OPERATING A PERIODICALLY ACTIVATABLE SWITCHING TRANSISTOR

Hans-Dieter Schneider, Gross-Gerau, Germany, assignor to Fernseh G.m.b.H., Darmstadt, Germany Filed Mar. 21, 1963, Ser. No. 267,889

Claims priority, application Germany, Mar. 24, 1962, F 36,371

9 Claims. (Cl. 315—27)

The present invention concerns a circuit arrangement for operating a periodically activatable switching transistor controlling an inductive load. Circuit arrangements of this kind are particularly well suited for producing in television apparatus the deflector currents for cathode ray tubes.

When transistors are operated as switching devices, a certain delay of the switching action occurs because the charge carriers accumulated on the base electrode flow away too slowly. This delay time which is characteristic of the blocking layer of the semi-conductor is the shorter, the higher is the blocking voltage applied to the base-emitter circuit. However, there is an upper limit for the permissible blocking voltage and this limit value of the blocking voltage constitutes also a limit value for the shortest possible delay time. The delay of the switching action entails, e.g., a reduction of the available retrace time of sawtooth generators which is undesirable. On the other hand, it is desirable that such switching arrangements consume as little energy as possible in the control circuit portion while simultaneously the output energy is high so that the entire operation remains economical.

In circuit arrangements containing switching transistors controlling an inductive load it is conventional to arrange a diode in the load circuit which during the blocked condition of the transistor carries off the energy stored in the impedance of the circuit. In conventional circuits of this kind the bias voltage of the control electrode of the switching transistor is taken, e.g., from a battery although there exists the risk of destruction of the terminal transistor in case the control voltage should disappear for any reason. Conventionally the above mentioned bias voltage is also produced by means of an RC-circuit and a diode, which is a peak rectifier arrangement conventionally used in the television technique for stabilizing the black level amplitude. Further below this type of a bias voltage supply will be called television type peak rectifier arrangement. In the case of this last mentioned bias voltage supply it is rather inconvenient to influence the location of the working point thereof because the time constant determining members of the RC-circuit must be given rather large dimensions on account of the differentiation of the control impulse and in view of the resulting danger of overdriving the emitter-base circuit. However if the above mentioned components are given those large dimensions then they are bound to consume a relatively large portion of the control energy and are additionally very sensitive to temperature changes. In addition, if the working point of the circuit is determined in the above described manner, then it is not possible to utilize the maximum permissible blocking voltage at the base-emitter circuit, i.e., the resulting minimum duration of the delay time which is characteristic of the blocking layer of the particular transistor. As a consequence of this, particularly in deflector circuits, the time available for reducing or eliminating the field is unnecessarily and undesirably reduced. It would be of advantage if the base of the terminal or output transistor were connected with the emitter in a manner which involves only low ohmic resistance or possibly no resistance at all because only under this condition the maximum permissible collector voltage can be utilized at the transistor. However it has not been possible up to now to accomplish this. It should be noted also that in the above mentioned television type peak rectifier arrangement the diode of this arrangement is likely to display a response delay which would also result in a differentiation of the blocking impulse.

It is therefore an object of this invention to provide for a circuit arrangement for operating a periodically activatable switching transistor controlling an inductive load in such a manner that the above mentioned difficulties or disadvantages of conventional circuits are avoided. With above object in view the invention includes a circuit arrangement of the type set forth in which a transistor is provided which has a base, a collector and an emitter electrode, and control means for furnishing to the transistor a control impulse comprising a blocking period with a blocking voltage of predetermined amplitude and an unblocking period with an unblocking voltage of predetermined amplitude. A damping diode is connected in parallel with the load across the emitter-collector circuit of the transistor, and a transformer is provided for coupling the control means with the transistor means, the secondary winding of the transformer being connected in circuit with the emitter and base electrodes of the transistor. The parameters of the control means and of the transistor means are so chosen that the blocking voltage amplitude of the control impulse is substantially equal to the maximum permissible blocking potential of the transistor means, while the unblocking voltage amplitude of the control impulse is a time function of the voltage required for saturating the transistor means, the product of the blocking period and the maximum permissible blocking voltage being substantially equal to the integral of said time function of the unblocking voltage over the duration of the unblocking period.

More specifically, the secondary winding of the transformer is directly connected with the emitter and the base of the transistor; in order to produce the necessary unblocking potential and the permissible blocking potential the pause-to-pulse ratio in the control impulse is chosen to be equal to the ratio between the unblocking voltage and the blocking voltage. It will be seen that it is possible to freely adjust the above mentioned pause-to-pulse ratio, i.e., to apply an unblocking voltage to the control electrode before the stored retrace energy has flowed away completely from the inductance, if during this time interval the emitter-collector circuit of the transistor constitutes a comparatively high impedance in comparison to that of the damping diode. In this manner the desired result is achieved that the shortest possible delay time of the transistor switching action is available while the energy consumed in the control action is very small.

This type of operation is particularly advantageous if transistors are used which have a relatively low breakdown resistance of the base-emitter circuit in blocking direction, e.g., transistors of the so-called diffusion alloy type. In this manner an overdriving of the transistor by positive differentiation peaks which may result from a rectification effect in the control circuit is safely avoided.

In conventional circuits it is customary to use for the correct determination of the working point a peak rectifier circuit of the above mentioned television type which produces the effect that the positive portion of the alternating voltage is kept at a constant potential. However, the inertia of the available diodes has the effect that in the case of very steep control impulse shoulders the control impulse is differentiated over the time constant characteristic of the particular diode so that in said case of very steep control pulse shoulders the location of the working point in a fixed position is not assured. It will be seen that most advantageously the invention makes it unnecessary to provide for a peak rectifier circuit as mentioned above.

In a further development of the invention the energy consumed in the control circuit can be further reduced if the shape of the unblocking impulse appearing at the control electrode corresponds to the function $U_{st}=f(t)$ which assures a saturation of the transistor corresponding to the momentary value of the output current, provided that additionally the above mentioned pause-to-pulse ratio $$\frac{T_1}{T_{ges}-T_1}$$

is determined by the equation $$\int_{T_1}^{T_{ges}} f(t)dt = A \cdot T_1$$

wherein $T_1$ is the blocking period, A is the blocking voltage and $T_{ges}$ is the entire period of a complete control impulse. Further below B will be used as a symbol for the unblocking voltage and $T_2$ will represent the unblocking period.

It is advisable to produce the control impulse required for controlling the switching transistor in an advance stage wherein the pause-to-pulse ratio of the synchronous impulse is adjusted to the desired value by the adjusted charging of a capacitor. If for instance the blocking voltage at the control electrode amounts to A volts and if the unblocking voltage for producing the collector current by saturation of the transistor is supposed to reach a maximum of B volts, then in accordance with the invention within a complete control impulse period $T_{ges}$ the ratio between the blocking time $T_1$ and the unblocking time $T_2$, i.e., the so-called pause-to-pulse ratio $T_1/T_2$ is chosen to be equal to the ratio $B/A$. However, if the saturating voltage at the control electrode rises in a sawtooth shape up to a maximum potential B, then the pause-to-pulse ratio may amount to $B/2A$ as will be explained further below. By choosing the above mentioned pause-to-pulse ratio and by using a direct inductive coupling for the control impulses it will be achieved that the correct or desired working point will appear automatically on the control characteristic and that the control voltage required for most efficiently carrying off the charge carriers is applied to the transistor through the entire blocking period. Finally it will be seen that it is advantageous to give the blocking impulse a sloping shoulder on the side adjacent to the following unblocking impulse.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 2, 3, 4:
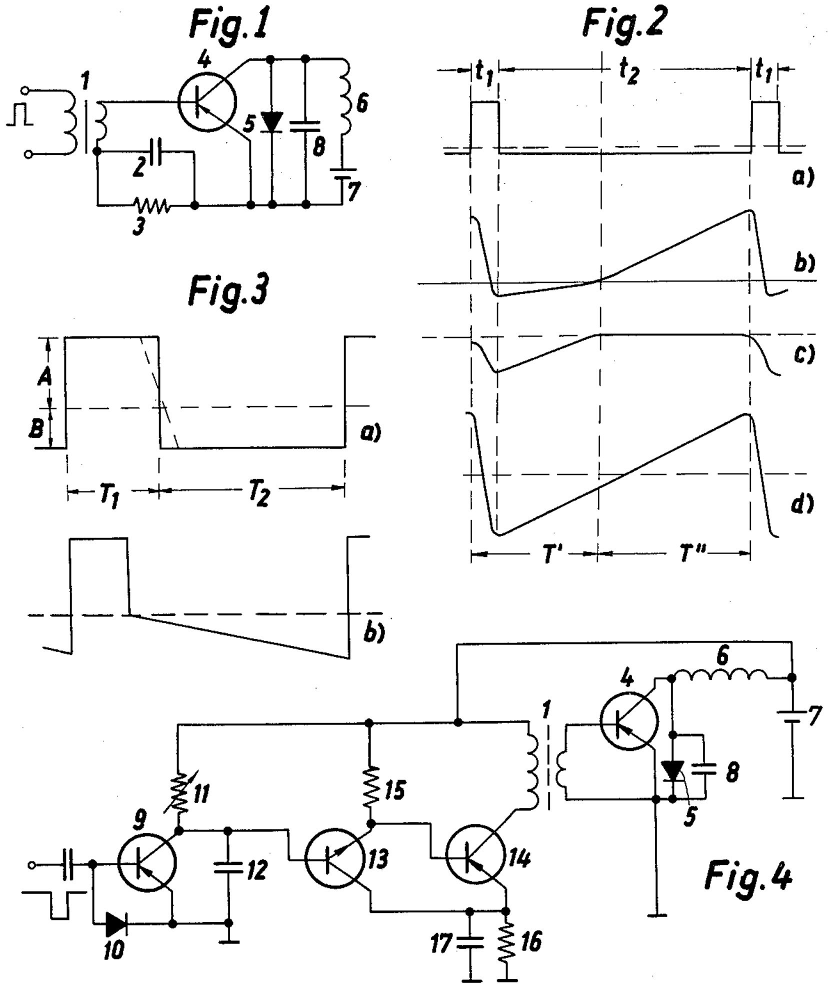
FIG. 1 is a schematic circuit diagram of an arrangement according to the prior art.
FIG. 2 is a group of diagrams for illustrating the operation of a switching transistor controlling the inductive load according to FIG. 1.
FIG. 3 is a combination of diagrams illustrating the operation of a circuit according to the invention.
FIG. 4 is a schematic circuit diagram illustrating one embodiment of the invention.

Referring to FIG. 1 illustrating a typical end stage of a deflection control circuit it can be seen that the transistor 4 acts as a switching device and that the coil 6 constitutes an inductive load. The synchronization impulses appearing at the transformer 1 establish, during the negative phase thereof, conductive connection with the coil 6 through the transistor 4 while the diode 5 is in non-conductive condition. Consequently a current as illustrated by the curve *b* of FIG. 2 flows through the transistor 4 and the coil 6. During the time period $t_1$ as illustrated in the portion *a* of FIG. 2 the switching device 4 and the diode 5 are in blocked or non-conductive condition due to the blocking impulse voltage as illustrated in the portion *a* of FIG. 2. Now the magnetic field produced in the coil 6 decays and the stored energy produces a sine wave the negative half wave whereof lasts through the time period $t_1$ and passes through zero at the end of the synchronization pulses whereafter the sine wave continues with positive potential. At this moment the diode 5 becomes conductive and stays so approximately up to the end of the time period T′ as illustrated in the diagram *d* of FIG. 2 while a current as illustrated by diagram *c* of FIG. 2 flows through the diode 5. During the following time period T″ the switching transistor 4 is again in conductive condition while the diode 5 is in non-conductive condition. Consequently the cycle now repeats. The current through the coil 6 as illustrated by diagram *d* of FIG. 2 is composed of the two partial currents illustrated by the curves *b* and *c* of FIG. 2. The residual current illustrated in the portion $t_1$ of the diagram *b* of FIG. 2 and appearing during the time period T′ is intended to indicate that the semi-conductor or switching transistor 4 still absorbs a small portion of the return current. This is an ordinary occurrence with bilateral or symmetrical semi-conductors or transistors. In this case the currents split in accordance with the internal resistances of the switching transistor and of the diode, respectively.

However, by suitably arranging the circuit, e.g., by inductively coupling of the diode, it can be achieved that also with this type of switching transistor the return current is predominantly absorbed by the diode. Nevertheless it is to be stated that in carrying out the invention preferably a semi-conductor switch or switching transistor should be used which does not possess quasi symmetrical characteristics, or if so, only to a minor degree.

For a reliable operation of the circuit arrangement and for obtaining independence of temperature changes the control circuit for the switching transistor 4 is of great importance. This control circuit comprises according to FIG. 1 the secondary winding of the transformer 1 and the RC-circuit comprising the capacitor 2 and the resistance 3. Instead of the RC-circuit 2, 3 a peak rectifier circuit of the above mentioned television type may be used in which the transformer voltage is applied via a capacitor to the base electrode of the transistor 4, this base electrode being connected via a diode with the emitter. In both cases, however, it is difficult to choose the proper parameters of the control circuit because the latter has to be so constructed that the blocking voltage is maintained which is required for carrying off the residual charges while, on the other hand, the amplitude of the unblocking voltage during the time period T″ (FIG. 2) is sufficient for causing saturation of the switching transistor.

In the introductory portion it has been stated that a differentiation of the synchronization impulses in the control circuit and the resulting excessive amplitude of the blocking voltage would necessitate the use of a very amply dimensioned capacitor 2 in the control circuit, said capacitor having to be an electrolytic type capacitor which is therefore subject to changes with time and sensitive to temperature changes. However, in accordance with the invention it is possible to connect the secondary winding of the transformer 1 directly with the base and with the emitter of the switching transistor 4 as illustrated by FIG. 4 provided that the pause-to-pulse ratio of the control impulses is suitably chosen.

Reference is now made to FIG. 3. If for instance the amplitude A represents exactly the maximum permissible blocking voltage for the transistor 4 and if B represents the necessary unblocking voltage amplitude, then the pause-to-pulse ratio $T_1/T_2$ is to be chosen in such a manner that the product of the time period $T_1$ and the amplitude A is equal to the product of the time period $T_2$ and the amplitude B. If this is done then the working point of the transistor 4 adjusts itself automatically to the correct value at the secondary side of the transformer 1. For instance the maximum blocking voltage for a conventional transistor of the commercial type 2N1046 is +1.5 volts and the maximum saturation voltage is —.8 volt. In this case the pause-to-pulse ratio $T_1/T_2$ is to be chosen to be approximately 1/1.9. It may be advisable in certain cases to select the circuit parameters in a well known manner so that the rear flank of the blocking impulse occurring during the time period $T_1$ displays a slope as illustrated in dotted lines in portion *a* of FIG. 3. On the other hand, particularly in the case of vertical deflector control circuits in television apparatus, it is advantageous to give the unblocking voltage during time period $T_2$ substantially sawtooth form in order to cause the blocking voltage to tally with the sawtooth shape of the saturation current as illustrated in the diagram *d* of FIG. 2. In this case, because the area $T_2 \cdot B$ shown below the zero line in portion *a* of FIG. 3 is now divided in half, it is now necessary that $2A \cdot T_1$ be equal to $B \cdot T_2$, i.e. the duration of the blocking impulse is still further reduced. This will be understood if one realizes that the essential point is that the areas representing the product of time and amplitude and appearing above and below the neutral line, respectively, are of equal magnitude so that the pulse represents a genuine alternating voltage. By arranging matters in the manner set forth above it is safely avoided that the duration of the blocking pulse portion $T_1$ exceeds the duration of the blocking period T′ illustrated in the digram *d* of FIG. 2. This duration is essentially determined by the ohmic losses in the coil 6. However, these losses are for instance in conventional vertical deflector control circuits so small that even in the case of a rectangular shape of the unblocking voltage applied to the base of the switching transistor 4 the blocking period T′ will not be exceeded by the duration of the impulse portion $T_1$.

A control impulse characterized by the particular pause-to-pulse ratio according to the invention may be produced for instance by means of a circuit arrangement as illustrated by FIG. 4, namely in the advance transistor stages 9, 13 and 14. In this arrangement a capacitor 12 is charged via a resistor 11 and is then abruptly discharged in response to the application of an unblocking impulse to the transistor 9. The voltage appearing at the collector of the following amplifier stage 13 reproduces the just described voltage variation only to a limited degree because due to overdriving the transistor 13 a substantial portion of the voltage amplitude is clipped off at the capacitor 12.

Figure 5:
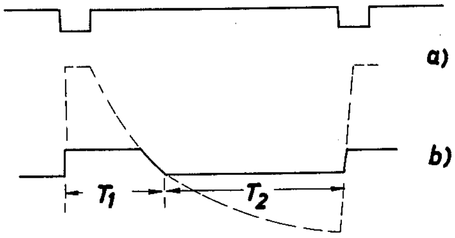
FIG. 5 is a diagram illustrating specifically the operation of the arrangement according to FIG. 4.

In the portion *a* of FIG. 5 the synchronization impulse is illustrated which causes periodically a short-time discharge of the capacitor 12 since it is applied to the base of the transistor 9. In the portion *b* of FIG. 5 the dotted curve represents the change of the potential at the collector of the transistor 9 as it would be present if no limiting circuit components e.g. diodes or subsequent transistors were present. The curve drawn as a full line represents the control impulse appearing at the base of the transistor 14 and produced by the preceding stage. Thus this last mentioned curve illustrates the steep rise to positive potential occurring at the collector of the transistor 9 and consequently also at the base of the transistor 14. On the other hand the curve also illustrates the slope of the decrease of this potenial at the end of the pulse. In this circuit arrangement the pause-to-pulse ratio $T_1/T_2$ is solely determined by the magnitude of the time constant of the RC-circuit 11, 12. In a well known manner this time constant can be adjusted as may be required by adjusting the variable resistor 11. The thus produced impulse is amplified by the direct current amplifier 14 so that it reaches the predetermined or desired amplitude which can be precalculated on the basis of the transformation ratio of the transformer 1 and of the sum of the maximum blocking voltage A and the required unblocking voltage B.

It can be seen readily that the circuit arrangement according to FIG. 4 furnishes the desired control impulse with the desired pause-to-pulse ratio with comparatively simple means which are at the same time insensitive or practically insensitive to temperature changes. It is evident that the time constant determining component of the control circuit may be constituted of a dry type capacitor 12 and a temperature-insensitive variable resistor 11. In any case, the transistors 9, 13 and 14 are inexpensive circuit components dealing with small amounts of energy. The circuit arrangement according to the invention has been experimentally tested and has been found to yield the desired results most satisfactorily. In this experimental circuit arrangement which was used for producing the vertical deflector current in an orthicon camera tube the following circuit components have been used:

| | |
|---|---|
| Transistor **4** | 2N1046 |
| Transistor **9** | 2SA17 |
| Transistor **13** | OC141 |
| Transistor **14** | AC124 |
| Capacitor **8** | μf__ 0.1 |
| Capacitor **12** | μf__ 0.1 |
| Capacitor **17** | μf__ 100 |
| Diode **5** | OA5 |
| Diode **10** | OA31 |
| Resistor **11** | KΩ__ 3.3 |
| Resistor **15** | KΩ__ 1 |
| Resistor **16** | Ω__ 50 |
| Transformer **1**, transformation ratio, primary to secondary | 75:6 |

It will be understood that each of the elements described above, or two or more together, may also find a useful application in other types of a circuit arrangement for operating a switching transistor differing from the types described above.

While the invention has been illustrated and described as embodied in a circuit arrangement for operating a periodically activatable switching transistor controlling an inductive load, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A circuit arrangement for operating a periodically activatable switching transistor controlling an inductive load, particularly the deflector coils of a cathode ray tube, comprising, in combination, transistor means having a base, a collector and an emitter electrode; control means for furnishing to said transistor means a control impulse comprising a blocking period with a blocking voltage of predetermined amplitude and an unblocking period with an unblocking voltage of predetermined amplitude; damping diode means connected in parallel with the load across the emitter-collector circuit of said transistor means; and transformer means coupling said control means with said transistor means and comprising a secondary winding in circuit with said emitter and base electrodes of said transistor means, the parameters of said control means and of said transistor means being so chosen that said blocking voltage amplitude of said control impulse is substantially equal to the maximum permissible blocking potential of said transistor means, and that said unblocking voltage amplitude of said control impulse is a time function of the voltage required for saturating said transistor means, the product of said blocking period and said maximum permissible blocking voltage being substantially equal to the integral of said time funtion of said unblocking voltage over the duration of said unblocking period.

2. A circuit arrangement for operating a periodically activatable switching transistor controlling an inductive load, particularly the deflector coils of a cathode ray tube, comprising, in combination, transistor means having a base, a collector and an emitter electrode; control means for furnishing to said transistor means a control impulse comprising a blocking period with a blocking voltage of predetermined amplitude and an unblocking period with an unblocking voltage of predetermined amplitude; damping diode means connected in parallel with the load across the emitter-collector circuit of said transistor means; and transformer means coupling said control means with said transistor means and comprising a secondary winding in circuit with said emitter and base electrodes of said transistor means, the parameters of said control means and of said transistor means being so chosen that said blocking voltage amplitude of said control impulse is substantially equal to the maximum permissible blocking potential of said transistor means, and that said unblocking voltage amplitude of said control impulse is a time function of the voltage required for saturating said transistor means, the product of said blocking period and said maximum permissible blocking voltage being substantially equal to the product of the maximum required unblocking voltage and the duration of said unblocking period.

3. A circuit arrangement for operating a periodically activatable switching transistor controlling an inductive load, particularly the deflector coils of a cathode ray tube, comprising, in combination, transistor means having a base, a collector and an emitter electrode; control means for furnishing to said transistor means a control impulse comprising a blocking period with a blocking voltage of predetermined amplitude and an unblocking period with an unblocking sawtooth voltage of predetermined amplitude; damping diode means connected in parallel with the load across the emitter-collector circuit of said transistor means; and transformer means coupling said control means with said transistor means and comprising a secondary winding in circuit with said emitter and base electrodes of said transistor means, the parameters of said control means and of said transistor means being so chosen that said blocking voltage amplitude of said control impulse is substantially equal to the maximum permissible blocking potential of said transistor means, and that said unblocking voltage amplitude of said control impulse is a time function of the voltage required for saturating said transistor means, the product of said blocking period and said maximum permissible blocking voltage being substantially one half of the product of the maximum required unblocking voltage and the duration of said unblocking period.

4. A circuit arrangement for operating a periodically activatable switching transistor controlling an inductive load, particularly the deflector coils of a cathode ray tube, comprising, in combination, transistor means having a base, a collector and an emitter electrode; control means for furnishing to said transistor means a control impulse comprising a blocking period with a blocking voltage of predetermined amplitude and an unblocking period with an unblocking voltage of predetermined amplitude, said control means including capacitor means connected for causing said impulse to have a steep shoulder at the transition from unblocking to blocking voltage, and for causing said impulse to have a slope transition from blocking to unblocking voltage; damping diode means connected in parallel with the load across the emitter-collector circuit of said transistor means; and transformer means coupling said control means with said transistor means and comprising a secondary winding in circuit with said emitter and base electrodes of said transistor means, the parameters of said control means and of said transistor means being so chosen that said blocking voltage amplitude of said control impulse is substantially equal to the maximum permissible blocking potential of said transistor means, and that said unblocking voltage amplitude of said control impulse is a time function of the voltage required for saturating said transistor means, the product of said blocking period and said maximum permissible blocking voltage being substantially equal to the integral of said time function of said unblocking voltage over the duration of said unblocking period.

5. A circuit arrangement for operating a periodically activatable switching transistor controlling an inductive load, particularly the deflector coils of a cathode ray tube, comprising in combination, transistor means having a base, a collector and an emitter electrode; control means for furnishing to said transistor means a control impulse comprising a blocking period with a blocking voltage of predetermined amplitude and an unblocking period with an unblocking voltage of predetermined amplitude, said control means including capacitor means connected for causing said impulse to have a steep shoulder at the transition from unblocking to blocking voltage, and for causing said impulse to have a slope transition from blocking to unblocking voltage; damping diode means connected in parallel with the load across the emitter-collector circuit of said transistor means; and transformer means coupling said control means with said transistor means and comprising a secondary winding in circuit with said emitter and base electrodes of said transitsor means, the parameters of said control means and of said transistor means being so chosen that said blocking voltage amplitude of said control impulse is substantially equal to the maximum permissible blocking potential of said transistor means, and that said unblocking voltage amplitude of said control impulse is a time function of the voltage required for saturating said transistor means, the product of said blocking period and said maximum permissible blocking voltage being substantially equal to the product of the maximum required unblocking voltage and the duration of said unblocking period.

6. A circuit arrangement for operating a periodically activatable switching transistor controlling an inductive load, particularly the deflector coil of a cathode ray tube, comprising, in combination, transistor means having a base, a collector and an emitter electrode; control means for furnishing to said transistor means a control impulse comprising a blocking period with a blocking voltage of predetermined amplitude and an unblocking period with an unblocking sawtooth voltage of predetermined amplitude, said control means including capacitor means connected for causing said impulse to have a steep shoulder at the transistion from unblocking to blocking voltage, and for causing said impulse to have a slope transition from blocking to unblocking voltage; damping diode means connected in parallel with the load across the emitter-collector circuit of said transistor means; and transformer means coupling said control means with said transistor means and comprising a secondary winding in circuit with said emitter and base electrodes of said transistor means, the parameters of said control means and of said transistor means being so chosen that said blocking voltage amplitude of said control impulse is substantially equal to the maximum permissible blocking potential of said transistor means, and that said unblocking voltage amplitude of said control impulse is a time function of the voltage required for saturating said transistor means, the product of said blocking period and said maximum permissible blocking voltage being substantially one half of the product of the maximum required unblocking voltage and the duration of said unblocking period.

7. A circuit arrangement for operating a periodically activatable switching transistor controlling an inductive load, particularly the deflector coils of a cathode ray tube, comprising, in combination, transistor means having a base, a collector and an emitter electrode; control means for furnishing to said transistor means a control impulse comprising a blocking period with a blocking voltage of predetermined amplitude and an unblocking period with an unblocking voltage of predetermined amplitude, said control means including sawtooth voltage generator means controllable by synchronizing pulses from an outside source and time constant determining means comprising an adjustable RC-circuit, and means for determining a constant maximum amplitude of said control impulse; damping diode means connected in parallel with the load across the emitter-collector circuit of said transistor means; and transformer means coupling said control means with said transistor means and comprising a secondary winding in circuit with said emitter and base electrodes of said transistor means, the parameters of said control means and of said transistor means being so chosen that said blocking voltage amplitude of said control impulse is substantially equal to the maximum permissible blocking potential of said transistor means, and that said unblocking voltage amplitude of said control impulse is a time function of the voltage required for saturating said transistor means, the product of said blocking period and said maximum permissible blocking voltage being substantially equal to the integral of said time function of said unblocking voltage over the duration of said unblocking period, the ratio between the durations of said blocking and unblocking periods being adjustable by means of said adjustable RC-circuit.

8. A circuit arrangement for operating a periodically activatable switching transistor controlling an inductive load, particularly the deflector coils of a cathode ray tube, comprising, in combination, transistor means having a base, a collector and an emitter electrode; control means for furnishing to said transistor means a control impulse comprising a blocking period with a blocking voltage of predetermined amplitude and an unblocking period with an unblocking voltage of predetermined amplitude, said control means including sawtooth voltage generator means controllable by synchronizing pulses from an outside source and time constant determining means comprising an adjustable RC-circuit, and means for determining a constant maximum amplitude of said control impulse; damping diode means connected in parallel with the load across the emitter-collector circuit of said transistor means; and transformer means coupling said control means with said transistor means and comprising a secondary winding in circuit with said emitter and base electrodes of said transistor means, the parameters of said control means and of said transistor means being so chosen that said blocking voltage amplitude of said control impulse is substantially equal to the maximum permissible blocking potential of said transistor means, and that said unblocking voltage amplitude of said control impulse is a time function of the voltage required for saturating said transistor means, the product of said blocking period and said maximum permissible blocking voltage being substantially equal to the product of the maximum required unblocking voltage and the duration of said unblocking period, the ratio between the duration of said blocking and unblocking periods being adjustable by means of said adjustable RC-circuit.

9. A circuit arrangement for operating a periodically activatable switching transistor controlling an inductive load, particularly the deflector coils of a cathode ray tube, comprising, in combination, transistor means having a base, a collector and an emitter electrode; control means for furnishing to said transistor means a control impulse comprising a blocking period with a blocking voltage of predetermined amplitude and an unblocking period with an unblocking sawtooth voltage of predetermined amplitude, said control means including sawtooth voltage generator means controllable by synchronizing pulses from an outside source and time constant determining means comprising an adjustable RC-circuit, and means for determining a constant maximum amplitude of said control impulse; damping diode means connected in parallel with the load across the emitter-collector circuit of said transistor means; and transformer means coupling said control means with said transistor means and comprising a secondary winding in circuit with said emitter and base electrodes of said transistor means, the parameters of said control means and of said transistor means being so chosen that said blocking voltage amplitude of said control impulse is substantially equal to the maximum permissible blocking potential of said transistor means, and that said unblocking voltage amplitude of said control impulse is a time function of the voltage required for saturating said transistor means, the product of said blocking period and said maximum permissible blocking voltage being substantially one half of the product of the maximum required unblocking voltage and the duration of said unblocking period, the ratio between the durations of said blocking and unblocking periods being adjustable by means of said adjustable RC-circuit.

References Cited by the Examiner

UNITED STATES PATENTS 2,962,626 11/60 Berg et al. ............ 315—27

DAVID G. REDINBAUGH, *Primary Examiner.*